(12) United States Patent
Huang

(10) Patent No.: US 9,658,413 B2
(45) Date of Patent: May 23, 2017

(54) OPTICAL CONNECTOR AND OPTICAL COUPLING ASSEMBLY

(71) Applicant: HON HAI PRECISION INDUSTRY CO., LTD., New Taipei (TW)

(72) Inventor: Hsin-Shun Huang, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 55 days.

(21) Appl. No.: 14/691,300

(22) Filed: Apr. 20, 2015

(65) Prior Publication Data
US 2016/0131847 A1    May 12, 2016

(30) Foreign Application Priority Data
Nov. 7, 2014 (TW) .............................. 103138843 A

(51) Int. Cl.
G02B 6/42   (2006.01)
G02B 6/43   (2006.01)
G02B 6/32   (2006.01)
G02B 6/44   (2006.01)

(52) U.S. Cl.
CPC ........... G02B 6/4214 (2013.01); G02B 6/322 (2013.01); G02B 6/4204 (2013.01); G02B 6/425 (2013.01); G02B 6/4206 (2013.01); G02B 6/4428 (2013.01); G02B 6/4292 (2013.01); G02B 6/4403 (2013.01)

(58) Field of Classification Search
None
See application file for complete search history.

(56) References Cited

U.S. PATENT DOCUMENTS

| | | | | |
|---|---|---|---|---|
| 8,611,716 B2* | 12/2013 | DeMeritt | ............. | G02B 6/4214 385/130 |
| 2012/0213475 A1* | 8/2012 | Selli | ..................... | G02B 6/4214 385/33 |

* cited by examiner

Primary Examiner — Michelle R Connely
(74) Attorney, Agent, or Firm — Steven Reiss

(57) ABSTRACT

An optical connector includes a main body, a ribbon fiber and a ribbon fiber holder. The main body includes a bottom surface, and a mounting surface facing away from the bottom surface. The bottom surface arranged with a plurality of first lenses, the mounting surface is arranged with a number of second lenses corresponding with each second lens. The ribbon fiber includes a number of optical fibers arranged in an array, each optical fibers is corresponded with one of second lenses. Each optical fiber includes an incident surface, an angle between the incident surface and a horizontal surface is about 45 degrees. The ribbon fiber holder is matched with the main body and configured for clamping the ribbon fiber to make each second optical lens being located under the optical fiber and aligned with the incident surface of each optical fiber.

19 Claims, 6 Drawing Sheets

OPTICAL CONNECTOR AND OPTICAL COUPLING ASSEMBLY

FIELD

The subject matter herein generally relates to fiber optical communications.

BACKGROUND

In the field of fiber optic communications, an optical connector often includes a main body and at least one optical fiber. The main body includes at least one coupling lens corresponding with the optical fiber, and the coupling lens is aligned to the optical fiber to complete transmission of optical signals. Transmission quality of the optical signals is determined by the alignment between the coupling lens and the optical fiber.

BRIEF DESCRIPTION OF THE DRAWINGS

Implementations of the present technology will now be described, by way of example only, with reference to the attached figures.

DETAILED DESCRIPTION

Figure 1:
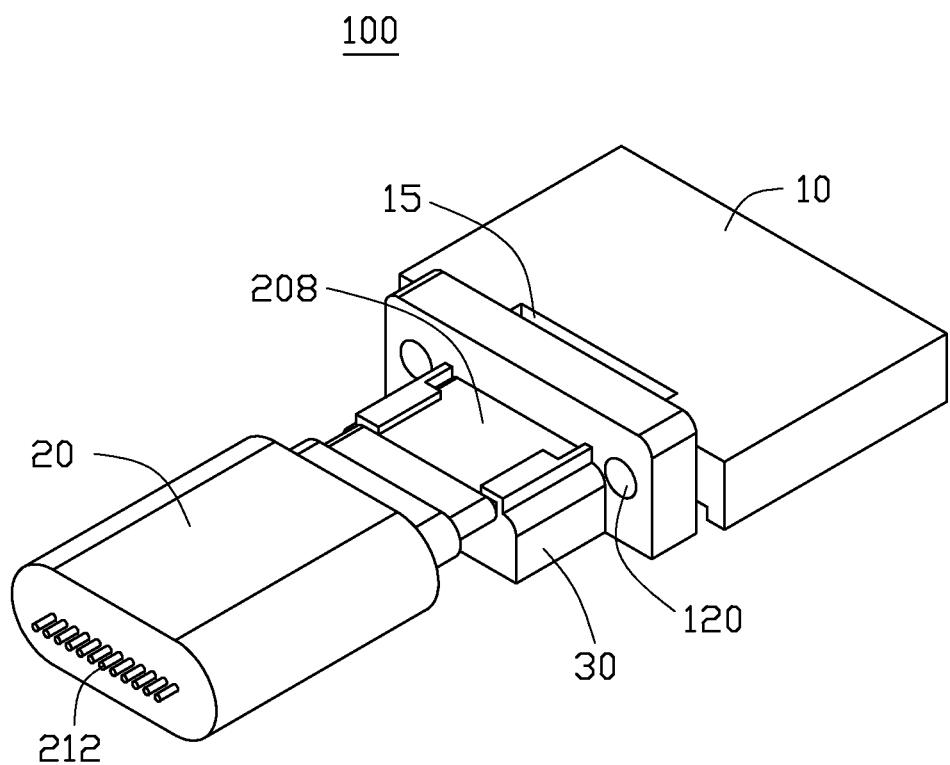
FIG. 1 is an isometric view of an optical connector, in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like. The references "a plurality of" and "a number of" mean "at least two."

FIG. 1 shows an optical connector 100. The optical connector 100 includes a main body 10, a ribbon fiber 20 and a ribbon fiber holder 30.

Figure 2:
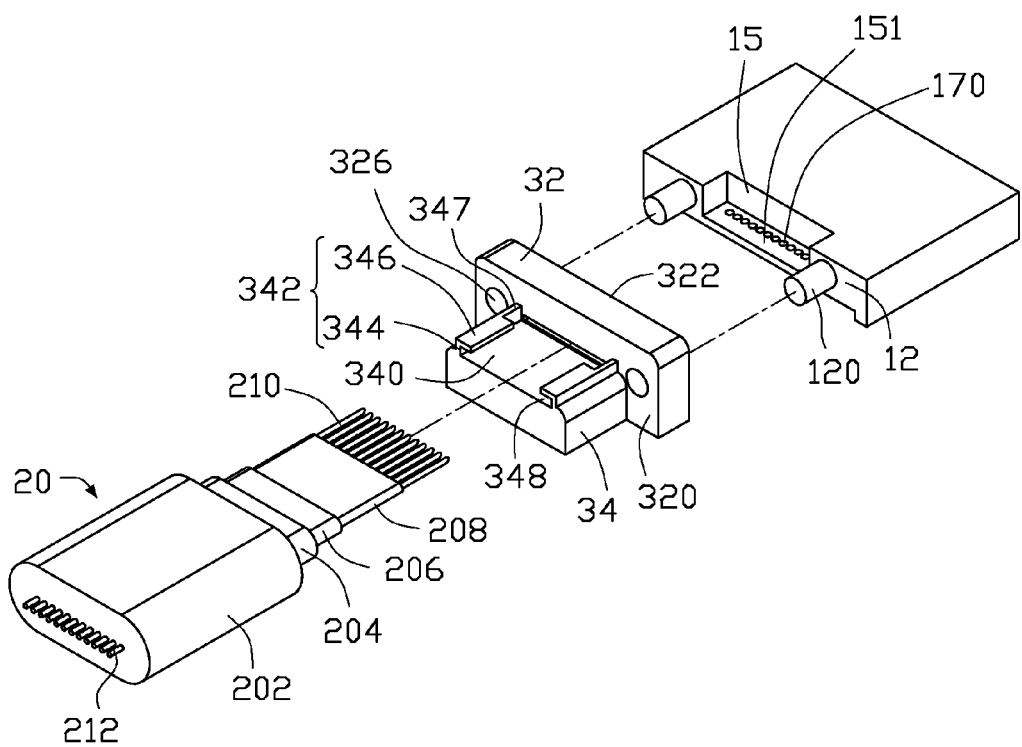
FIG. 2 is an exploded isometric view of the optical connector of FIG. 1.
Figure 3:
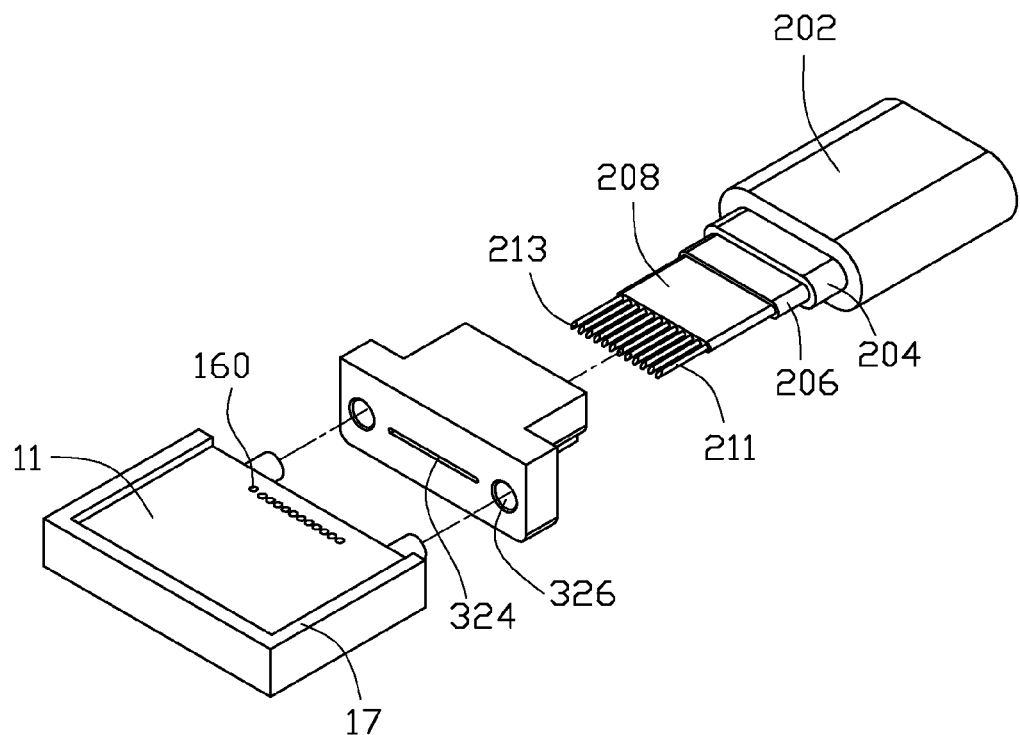
FIG. 3 is similar to FIG. 2, but viewed from another angle.

The main body 10 is substantially a cuboid and made of transparent material. The main body 10 includes a bottom surface 11, a top surface 13 opposite to the bottom surface 11, and a side surface 12 perpendicularly connecting the bottom surface 11 and the top surface 13, as shown in FIG. 2. The top surface 13 and the side surfaces 12 together define a recess 15, the recess 15 includes a mounting surface 151. The bottom surface 11 is arranged with a number of first lenses 160, as shown in FIG. 3. The mounting surface 151 is arranged with a number of second lenses 170, each first lens 160 is corresponded with each second lens 170. Preferably, the first lenses 160 and the second lenses 170 are Fresnel lenses, respectively. In this embodiment, the side surface 12 includes two positioning posts 120 arranged at two sides of the recess 15.

The main body 10 further includes a ridge 17 extending away from the bottom surface 11. The ridge 17 is arranged along a periphery of the bottom surface 11, the first lenses 160 are partially surrounded by the ridge 17.

The ribbon fiber 20 includes a jacket 202, a strengthening member 204, a binder 206, a buffer 208, and a number of optical fibers 210 having fixed pitch arranged in an array. The buffer 208 surrounds the optical fibers 210 and protects the optical fibers 210, the binder 206 bonds the buffer 208 to the strengthening member 204, and the jacket 202 receives the combined strengthening member 204, the binder 206, the buffer 208 and the optical fibers 210 therein. Each optical fiber 210 includes a first end 211 and a second end 212 (FIG. 5) opposite to the first end 211, the first end 211 is exposed outside of the buffer 208, the second end 212 is exposed outside of the jacket 202. The first end 211 is cut to define an incident surface 213, an angle between the incident surface 213 and a horizontal surface is preferably about 45 degrees.

The ribbon fiber holder 30 is substantially T-shaped, and includes a connection plate 32 and a support member 34. The connection plate 32 includes a front surface 320 and a back surface 322 facing away from the front surface 320. The support member 34 is connected to the front surface 320, and defines a through hole 324 running through the front surface 320 and the back surface 322. The support member 34 includes a supporting surface 340 and two rails 342. The two rails 342 are supported by the supporting surface 340 and are parallel to each other, the two rails 342 and the top surface 340 cooperatively define a receiving channel 348. The receiving channel 348 communicates with the through hole 324.

Each rail 342 is substantially "L" shaped, and includes a support portion 344 and an extension portion 346 perpendicularly connected to the support portion 344, the two support portions 344 are supported by the supporting surface 340 and are parallel to each other, and extension portions of the two rails 342 extend towards each other. The receiving channel 348 is configured to guide a movement direction of the ribbon fiber 20, avoiding tilting when the ribbon fiber 20 is assembled with the ribbon fiber holder 30.

When the optical connector 100 is assembled, the buffer 208 of ribbon fiber 20 is inserted into the through hole 324 along the receiving channel 348, the optical fibers 210 are received in the through hole 324 and exposed from the back surface 322 through the through hole 324. A portion of the buffer 208 is exposed and a portion of the first end 210 of each optical fibers 210 is exposed, the exposed portion of the buffer 208 is received and fixed in the receiving channel 348.

The exposed portions of the optical fibers 210 are received in the through hole 324 and exposed from the back surface 322 through the through hole 324. Glue or other adhesive 350 (shown in FIG. 4) is received in the cutouts 347 to bond the exposed portion of the binder 206 to the rails 342 and the supporting surface 340. Thereby, the ribbon fiber 20 is fixed with the ribbon fiber holder 30, and the first end of the optical fiber 210 is exposed outside of the through hole 324, and then the positioning post 120 is inserted into the positioning hole 326, and the main body 10 is assembled with ribbon fiber holder 30, and the incident surface 213 faces the second lens 170.

Figure 4:
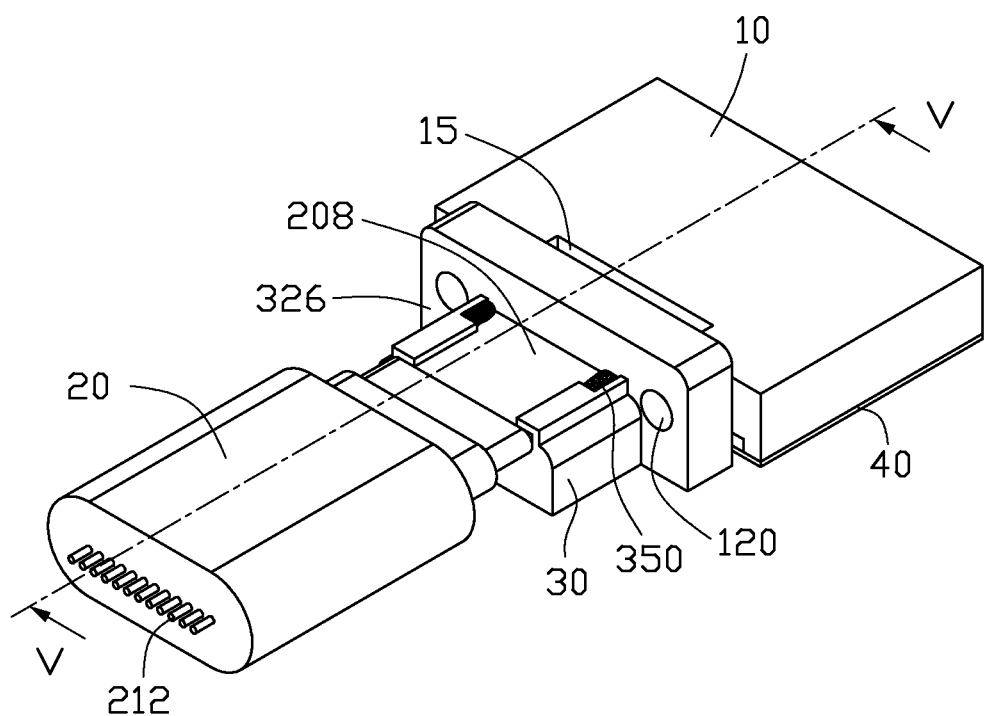
FIG. 4 is an isometric view of an optical coupling assembly, in accordance with a second embodiment.
Figure 5:
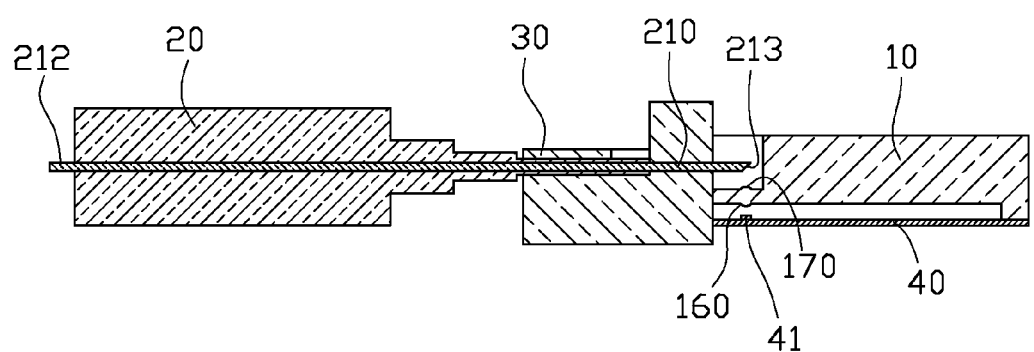
FIG. 5 is a cross sectional view taken along line V-V of the optical coupling assembly of FIG. 4.

FIGS. 4-5 show an optical coupling assembly 200. The optical coupling assembly 200 includes the optical connector 100 and a printed circuit board 40. The main body 10 is fixed with the printed circuit board 40 via the ridge 17. The printed circuit board 40 is arranged with a number of light emitters 41. The light emitter 41 is a laser diode (LD) for emitting light beams.

Figure 6:
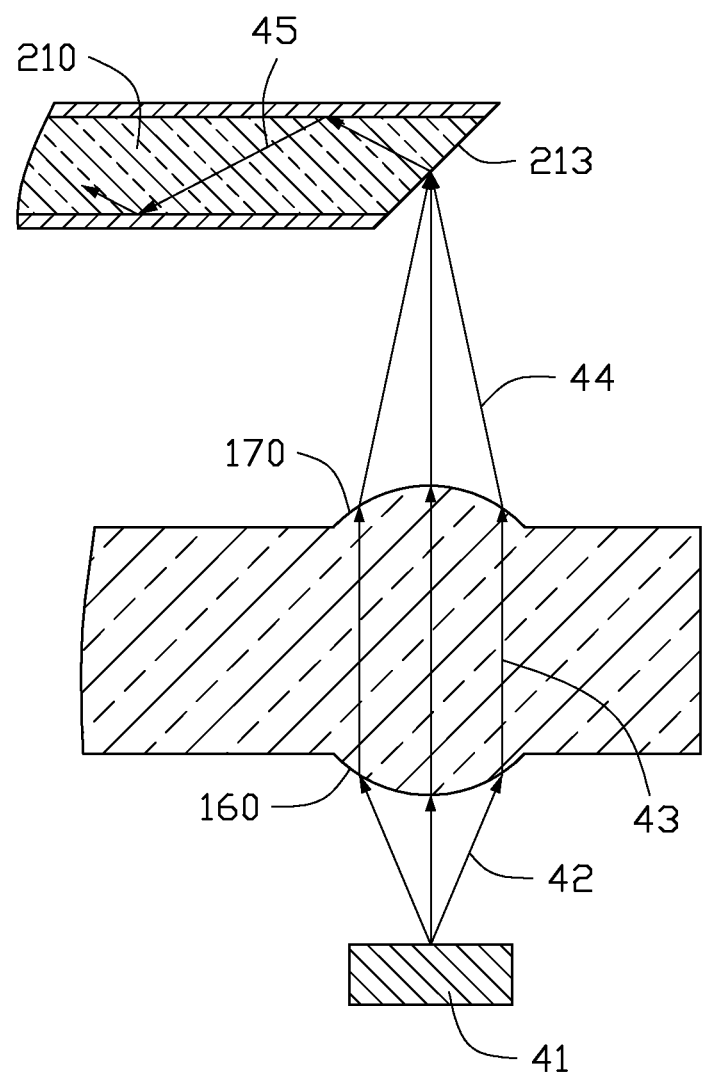
FIG. 6 shows a working principle of the optical coupling assembly in FIG. 5.

A working principle of the optical coupling assembly 200 is described as follows. When the optical coupling assembly 200 is in use, the light emitter 41 emits a light beam 42, the light beam 42 projects on the second coupling lens 40, and is collimated by the first lens 160 and then changed into a parallel beam 43, the parallel beam 43 is converged to a third beam 44 by the second lens 30 and projects on the incident surface 213 of the optical fiber 210, and the third beam 44 is changed into a fourth beam 44 and emitted out from the optical fibers 210, as shown in FIG. 6.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical connector comprising:
a main body comprising a bottom surface, and a mounting surface facing away from the bottom surface, the bottom surface being arranged with a plurality of first lenses, the mounting surface being arranged with a plurality of second lenses, each first lens being corresponding with each second lens;
a ribbon fiber comprising a plurality of optical fibers having fixed pitch arranged in an array, each optical fibers corresponding with one of second lenses, each optical fiber comprising an incident surface, an angle between the incident surface and a horizontal surface is about 45 degrees; and
a ribbon fiber holder being matched with the main body and configured for clamping the ribbon fiber to locate each second optical lens under the optical fiber and in alignment with the incident surface of each optical fiber, and wherein the ribbon fiber holder is substantially T-shaped and comprises a connection plate and a support member, the connection plate comprises a front surface and a back surface facing away from the front surface, the support member is connected to the front surface.

2. The optical connector of claim 1, wherein the main body is substantially a cuboid and further comprises a top surface and a side surface, the side surface perpendicularly connecting the bottom surface and the top surface, the top surface and the side surface cooperatively defines a recess, the recess comprises the mounting surface.

3. The optical connector of claim 1, wherein the connection plate defines a strip-shaped through hole running through the front surface and the back surface, the support member comprises a supporting surface and two rails, the two rails are supported by the supporting surface and parallel to each other.

4. The optical connector of claim 3, wherein the two rails and the supporting surface cooperatively define a receiving channel, the receiving channel communicates with the through hole, the ribbon fiber is received in the receiving channel, one end of the optical fibers is received in the through hole and exposed from the back surface through the through hole.

5. The optical connector of claim 4, wherein each rail is substantially "L" shaped, each rail comprises a support portion and an extension portion perpendicularly connected to the support portion, two support portions of the two rails are supported by the supporting surface and parallel to each other, and extension portions of the two rails extend towards each other.

6. The optical connector of claim 5, wherein each rail defines a cutout in the extension portion close to the front surface, the receiving channel communicates with two cutouts of the two rails, and glue is received in the cutouts to bond the ribbon fiber to the rails and the supporting surface.

7. The optical connector of claim 6, wherein the ribbon fiber comprises a jacket, a strengthening member, a binder, a buffer, and the optical fibers, the buffer surrounds the optical fibers and is configured to provide a buffer for protecting the optical fibers, the binder bonds the buffer to the strengthening member, and the jacket receives all of the strengthening member, the binder, the buffer and the optical fibers therein.

8. The optical connector of claim 7, wherein a portion of the binder is exposed and a portion of one end of each optical fibers is exposed, the exposed portion of the buffer is received and fixed in the receiving channel, the exposed portions of the optical fibers are received in the through hole and exposed from the back surface through the through hole, and the glue is received in the cutouts to bond the exposed portion of the buffer to the rails and the supporting surface.

9. The optical connector of claim 4, wherein the connection plate defines two positioning holes at two sides of the through hole, the two positioning holes run through the front surface and the back surface.

10. The optical connector of claim 9, wherein the main body comprises two positioning posts at two sides of the recess, each positioning post is matched with one positioning hole.

11. The optical connector of claim 10, wherein the main body further comprises a ridge extending away from the bottom surface, the ridge is arranged along a periphery of the bottom surface, the first lenses are surrounded by the ridge.

12. The optical connector of claim 1, wherein each second optical lens faces toward one of the incident surfaces.

13. An optical coupling assembly comprising:
a main body comprising a bottom surface, and a mounting surface facing away from the bottom surface, the bottom surface being arranged with a plurality of first lenses, the mounting surface being arranged with a plurality of second lenses, each first lens being corresponding with each second lens;

a ribbon fiber comprising a plurality of optical fibers having fixed pitch arranged in an array, each optical fibers corresponding with one of second lenses, each optical fiber comprising an incident surface, an angle between the incident surface and a horizontal surface is about 45 degrees; and a ribbon fiber holder being matched with the main body and configured for clamping the ribbon fiber to locate each second optical lens under the optical fiber and in alignment with the incident surface of each optical fiber, and wherein the ribbon fiber holder is substantially T-shaped and comprises a connection plate and a support member, the connection plate comprises a front surface and a back surface facing away from the front surface, the support member is connected to the front surface; and a printed circuit board, the printed circuit board being arranged with a plurality of light emitters, the light emitter being aligned with the first lens.

14. The optical coupling assembly of claim 13, wherein the support member comprises a supporting surface and two rails, the two rails supported by the supporting surface and parallel to each other, the two rails and the supporting surface cooperatively defining a receiving channel, the receiving channel communicates with the through hole, the ribbon fiber is received in the receiving channel, the optical fibers received in the through hole and exposed from the back surface through the through hole.

15. The optical coupling assembly of claim 14, wherein each rail is substantially "L" shaped, each rail comprises a support portion and an extension portion perpendicularly connected to the support portion, two support portions of the two rails are supported by the supporting surface and parallel to each other, and extension portions of the two rails extend towards each other.

16. The optical coupling assembly of claim 15, wherein each rail defines a cutout in the extension portion close to the front surface, the receiving channel communicates with two cutouts of the two rails, and glue is received in the cutouts to bond the ribbon fiber to the rails and the supporting surface.

17. The optical coupling assembly of claim 16, wherein the connection plate defines two positioning holes at two sides of the through hole, the two positioning holes run through the front and back surfaces, the main body comprises two positioning posts at two sides of the recess, each positioning post is matched with one positioning hole.

18. The optical coupling assembly of claim 17, wherein the ribbon fiber comprises a jacket, a strengthening member, a binder, a buffer, and the optical fibers, the buffer surrounds the optical fibers and is configured to provide a buffer for protecting the optical fibers, the binder bonds the buffer to the strengthening member, and the jacket receives all of the strengthening member, the binder, the buffer and the optical fibers therein.

19. The optical connector of claim 13, wherein each second optical lens faces toward one of the incident surfaces.

* * * * *